United States Patent
Toshikiyo et al.

(10) Patent No.: US 7,860,352 B2
(45) Date of Patent: Dec. 28, 2010

(54) LIGHT-COLLECTING APPARATUS AND CONTACT-TYPE SOLID-STATE IMAGING APPARATUS USING THE SAME

(75) Inventors: Kimiaki Toshikiyo, Osaka (JP); Motohiro Kojima, Osaka (JP); Kazutoshi Onozawa, Osaka (JP)

(73) Assignee: PANASONIC Corporation, Osaka (JP)

( * ) Notice: Subject to any disclaimer, the term of this patent is extended or adjusted under 35 U.S.C. 154(b) by 1059 days.

(21) Appl. No.: 11/423,803

(22) Filed: Jun. 13, 2006

(65) Prior Publication Data

US 2007/0035721 A1   Feb. 15, 2007

(30) Foreign Application Priority Data

Jun. 17, 2005 (JP) .............................. 2005-178185

(51) Int. Cl.
G02F 1/01 (2006.01)
H01J 3/14 (2006.01)
G01J 1/04 (2006.01)
G01N 21/00 (2006.01)

(52) U.S. Cl. .................. 385/1; 250/216; 250/208.1; 250/227.11; 356/73.1

(58) Field of Classification Search ................ 250/216, 250/208.1, 227.11; 385/1; 356/73.1
See application file for complete search history.

(56) References Cited

U.S. PATENT DOCUMENTS

| | | | |
|---|---|---|---|
| 4,639,790 A * | 1/1987 | Kusaka ....................... | 358/497 |
| 4,940,888 A * | 7/1990 | Nagata et al. ............. | 250/208.1 |
| 5,278,028 A * | 1/1994 | Hadimioglu et al. ........ | 430/321 |
| 5,331,146 A * | 7/1994 | Tanimizu .................. | 250/208.1 |
| 5,661,540 A * | 8/1997 | Kaihotsu et al. ................ | 355/1 |
| 5,847,754 A * | 12/1998 | Thornton ..................... | 348/97 |
| 6,265,706 B1 * | 7/2001 | Oliver et al. ............. | 250/208.1 |
| 6,366,408 B1 * | 4/2002 | Kittaka et al. ............... | 359/620 |
| 7,060,961 B2 | 6/2006 | Dobashi et al. | |
| 2006/0102827 A1 | 5/2006 | Kasuga et al. | |

FOREIGN PATENT DOCUMENTS

| | | |
|---|---|---|
| EP | 0596664 | 5/1994 |
| JP | 6-273602 | 9/1994 |
| JP | 6-342131 | 12/1994 |
| JP | 10 210213 | 8/1998 |

(Continued)

OTHER PUBLICATIONS

Partial English language translation of JP 6-273602.

(Continued)

*Primary Examiner*—Brian M. Healy
*Assistant Examiner*—Guy G Anderson
(74) *Attorney, Agent, or Firm*—Greenblum & Bernstein, P.L.C.

(57) ABSTRACT

The present invention provides a contact-type solid-state imaging apparatus which realizes high resolution and high sensitivity, and also implements downsizing and lowering the cost of the contact-type solid-state imaging apparatus. Each pixel includes a protection glass plate, a light-collecting device, a light-receiving device, a semiconductor integrated circuit, a light emitting diode (LED) and a mounting package. The light-collecting apparatus has two kinds of distributed index lens (o lens and convex lens), and Sin (N=2) film, which is a two-stage concentric structure, is embedded in $SiO_2$ (N=1.45) film.

10 Claims, 13 Drawing Sheets

FOREIGN PATENT DOCUMENTS

| | | |
|---|---|---|
| JP | 2001-108812 | 4/2001 |
| JP | 2001-318217 | 11/2001 |
| JP | 2004-334036 | 11/2004 |
| JP | 20050101757 A * | 1/2005 |
| JP | 2005 175234 | 6/2005 |
| JP | 2006 293066 | 10/2006 |

OTHER PUBLICATIONS

Partial English language translation of JP 2004-334036.
Partial English language translation of JP 10-210213.
English Language Abstract of JP 6-342131.
English Language Abstract of JP 2001-318217.
English Language Abstract of JP 2001-108812.
U.S. Appl. No. 10/576,023 to Toshikiyo, filed Apr. 17, 2006.
U.S. Appl. No. 10/576,273 to Toshikiyo, filed Apr. 18, 2006,.
U.S. Appl. No. 111423,776 to Toshikiyo et al., filed Jun. 13, 2006.
U.S. Appl. No. 11/423,989 to Ishii et al., filed Jun. 14, 2006.
U.S. Appl. No. 11/422,708 to Yamaguchi et al., filed Jun. 7, 2006.
English Language Abstract of JP 6-273602.
English Language Abstract of JP 2004-334036.
English Language Abstract of JP 10-210213.
English Language Abstract of JP 2005-175234.
English Language Abstract of JP 2006-293066.

* cited by examiner

Prior Art

Prior Art

LIGHT-COLLECTING APPARATUS AND CONTACT-TYPE SOLID-STATE IMAGING APPARATUS USING THE SAME

BACKGROUND OF THE INVENTION (1) Field of the Invention

The present invention relates to a solid-state imaging apparatus, and particularly to a contact-type solid-state imaging apparatus and the like.

(2) Description of the Related Art

A solid-state imaging apparatus (image sensor) is an essential element of an image input apparatus used for various types of image areas including a digital video camera (DVC), a digital still camera (DSC) and the like. In recent years, along with a spread of paperless information, that is, computerized image and character database, an image scanner apparatus has been increasingly in demand. Thus, it has been greatly demanded for a contact-type solid-state imaging apparatus which is used for the image scanner apparatus to implement downsizing and to realize high resolution.

FIG. 4 is a diagram showing a system structure of a conventional contact-type solid-state imaging apparatus. A light emitting diode 109 irradiates an object (original copy) 103, and a diffused reflection light (incident light) 102 from the object 103 is collected by a refractive index distribution rod lens 112, so as to form an image on a light-receiving device 107. The light-receiving device 107 is formed on a semiconductor integrated circuit 108, and converts an outgoing light 106 having information of contrasting density of the object 103 (that is, strong/weak of light intensity) into an electric signal. The system structure is a general structure of the contact-type solid-state imaging apparatus using a lens array (for example, refer to Patent Reference 1).

FIG. 3A is a diagram showing a structure of the conventional refractive index distribution rod lens 112, while FIG. 3B is a diagram showing a refractive index distribution of the aforesaid refractive index distribution rod lens 112. The refractive index distribution rod lens 112 is a cylindrical transparent lens in which a refractive index is changed continuously from the center toward the edge, and has a two-dimensional refractive index distribution in which the refractive index is decreased when a radius is increased. FIG. 2 is a diagram showing a transmission of a light in the refractive index distribution rod lens 112. A light incident from the edge of the lens passes through the lens curving a sine wave, and goes out from the other edge of the lens. At this time, the light convergence can be controlled depending on the lens length. An inverted image at the same magnification is obtained when the lens length is equal to ¼ of a sine wave cycle, an inverted image on the edge side is obtained when the lens length is equal to ½ of a sine wave cycle, an erected image at the same magnification is obtained when the lens length is equal to ¾ of a sine wave cycle, an erected image on the edge side is obtained when the lens length is equal to 1 sine wave cycle. The refractive index distribution rod lens 112 having aforesaid light characteristic can be easily installed in a various types of devices as the cylindrical shape, and the both edge sides of the lens are planes to which the light axis is orthogonal, so that the light axis easily matches the lens axis in an optical system.

However, in the conventional contact-type solid-state imaging apparatus 1000, the lens array is used so as to have an erected image of two-dimensional array. Therefore, it is necessary to have ¾ of a sine wave cycle approximately with high accuracy and have an image which is an identical to the next lens so as to form a rod lens having an accurate refractive index distribution. At present, the refractive index distribution rod lens is formed by two different types of processes mainly. The first process is a monomer volatile process and the other process is inter-diffusion process. In the former process, a monomer on the outer edge is volatilized from a fiber mixture of a low refractive index polymer and a high refractive index monomer, polymerized and cured so as to form a rod lens with refractive index distribution. In the latter process, a monomer group with different refractive index is a concentric fiber structure, and the monomer is diffused between layers, polymerized and cured so as to form a lens. A lens diameter more than 1 mm is necessary in either process, so as to control an accurate refractive index distribution. Thus, a thinning of a rod lens is extremely difficult.

FIG. 1 is a diagram showing the diffused reflection light 102 reflected by the object 103 passes through the refractive index distribution rod lens 112, and is converged at the light-receiving device 107. The refractive index distribution rod lens 112 is an imaging system for imaging at the same magnification, so that the image of the object is projected onto the sensor as the original copy. At this time, the spread of the light is more than 2 mm, which is very large comparing with a pixel size (pixel size is 64 μm at resolution 400 dpi, 42 μm at 600 dpi), and one lens collects the light for plural pixels for imaging. As a result, the signal characteristic is affected by the light-collecting characteristic of the refractive index distribution rod lens 112, so that a shading of contrasting by plural pixel units due to light intensity in the lens occurs.

Patent reference 1: Japanese Laid-Open Patent Application No. H6-342131

SUMMARY OF THE INVENTION

As mentioned above, the current refractive index distribution rod lens has a relatively longer lens diameter and does not have a reliable Modulation Transfer Function (MTF) characteristic. Thus, it is not easy for the imaging apparatus to implement downsizing and to realize high resolution. Hence, it will be necessary to develop a new light-collecting device which is able to control a reflection index accurately comparing with a refractive index distribution rod lens, and also which can be formed easily in order to realize downsizing, lowering the cost, and high performance of a contact-type solid-state imaging apparatus.

In view of aforesaid problem, in the present invention, a contact-type solid-state imaging apparatus includes a light-collecting device and a light-receiving device, and the light-collecting device has at least two kinds of light-transmitting films, each of which has an effective refraction index distribution, which are formed partially in the light-collecting device, and the light-transmitting films are placed at a paraxial imaging position in-line with a transmission direction of an incident light.

Accordingly, it is possible to manufacture a distributed index lens following the conventional semiconductor planar process. Thus, the incident light can be induced to the light-receiving device, so that a sensor with high resolution can be implemented.

In addition, the light-collecting device may include a combination of a plurality of zone areas with a concentric structure, the plurality of zone areas being divided into line width which are equal to or shorter than a wavelength of an incident light, at least one of the plurality of zone areas includes: a lower light-transmitting film with the concentric structure and having a first line width and a first film thickness; and an upper light-transmitting film with the concentric structure, configured above the lower light-transmitting film, and having a second line width and a second film thickness.

In addition, the effective refraction index distribution of the light-collecting device is asymmetric with respect to an optical axis. Accordingly, it is possible to transmit the incident light to an arbitrary direction, so that the freedom on the designing of the light-collecting optical system can be improved.

In addition, the contact-type solid-state imaging apparatus further includes plural light-collecting devices, and a light incident to the plurality of light-collecting devices may be transmitted to the light-receiving device. Accordingly, it is possible to reduce a diffraction area in higher level of the light-collecting device, so that the light-collecting loss can be decreased, and the light-collecting efficiency can be improved.

In addition, at least one of the at least two kinds of light-transmitting films placed at a paraxial imaging position may have a different chromatic aberration from the other light-transmitting film. Accordingly, the variation of the light-collecting efficiency depending on the incident wavelength can be moderated. As a result, a stable sensitivity in a broad wavelength area can be maintained.

In addition, at least one of the light-transmitting films from among the two kinds of light-transmitting films placed at a paraxial imaging position may have a different focal length from the other light-transmitting film. Accordingly, even when the distance between the object (original copy, photo and the like) and the light-collecting device is changed, it is possible to induce a signal light to the light-receiving device efficiently.

In addition, the light-collecting device may include a first light-collecting unit for collecting a light by a diffraction, and a second light-collecting unit for collecting a light by refraction. When the light intensities of the refractive light and the diffraction light are set up to almost same level, the depth of the focus becomes longer. As a result, it is possible to improve the legibility of an original copy.

In addition, the light-collecting devices are formed in monolithic on a semiconductor integrated circuit on which the light-receiving device is formed. Accordingly, it is possible to form the light-collecting device with a serial process, so that the accuracy of positioning of optical system can be improved. In addition, the lens setting is not required, so that the mounting can be easy, and the fact results in reduction in cost.

In addition, the light-transmitting films may form an optical waveguide structure having a light containing effect generated by a high-low differential in the reflection indexes. Accordingly, it is possible to induce the incident light into the light-receiving device efficiently, so that the sensitivity of the sensor can be improved.

In addition, a part or whole of the light-transmitting film is formed with a convex structure having a curved cross-section. Accordingly, the light-collecting efficiency of the light-collecting device can be improved, so that a sensor with high sensitivity can be implemented.

Moreover, the present invention can be implemented by a light-collecting apparatus which has light-collecting devices included in the contact-type solid-state imaging apparatus arranged in two-dimensional array or one-dimensional array, and also by a imaging method which uses the contact-type solid-state imaging apparatus.

The contact-type solid-state imaging apparatus according to the present invention includes the light-collecting device with above characteristics, so that it is possible to improve the resolution and the sensitivity, and to simplify the manufacture process.

FURTHER INFORMATION ABOUT TECHNICAL BACKGROUND TO THIS APPLICATION

The disclosure of Japanese Patent Application No. 2005-178185 filed on Jun. 17, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Hereafter, embodiments of the present invention will be described referring to diagrams. It should be noted that the present invention will be explained using the embodiments below and the attached diagrams just as examples, and it is obvious that the present invention is not limited to these examples.

First Embodiment

Figure 1:
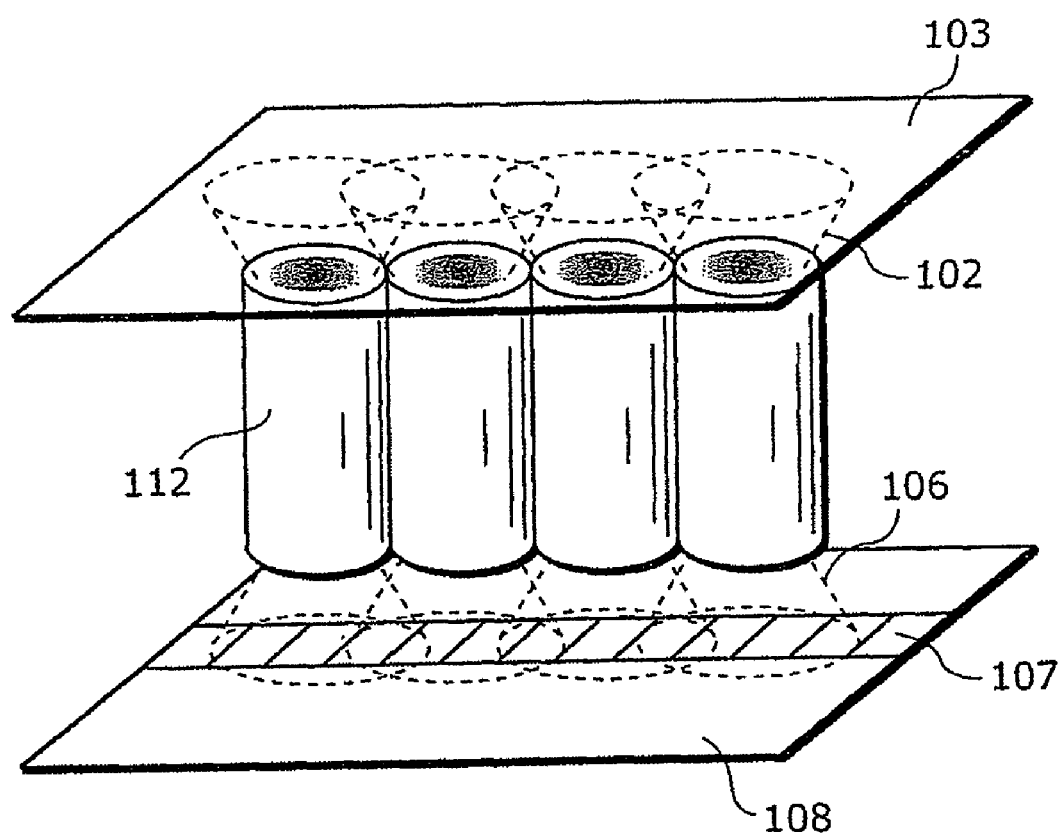
FIG. 1. is a diagram showing a basic structure of a conventional light-collecting device and a pixel array.
Figure 2:
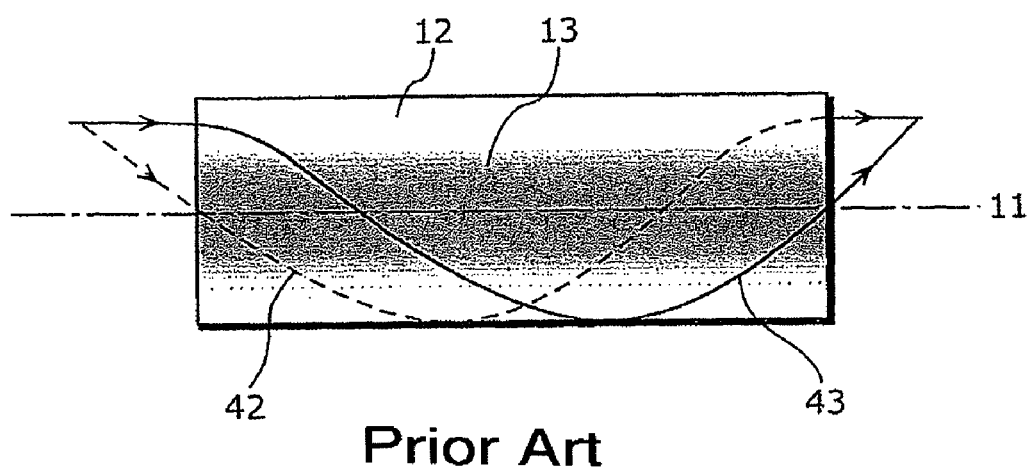
FIG. 2. is a diagram showing a transmission of a light in a conventional refractive index distribution rod lens.
Figure 3A:
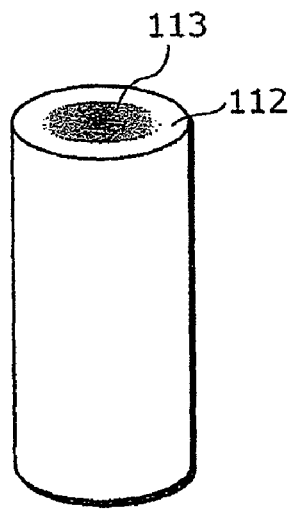
FIG. 3A is a diagram showing a structure of the refractive index distribution rod lens according to a conventional embodiment.
Figure 3B:
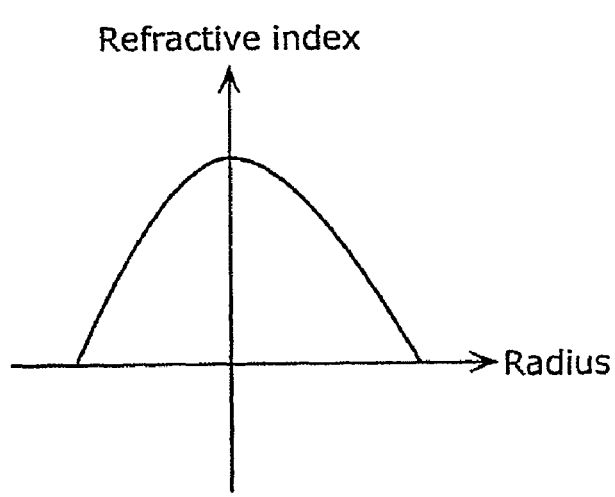
FIG. 3B is a diagram showing a refractive index distribution of the refractive index distribution rod lens according to the conventional embodiment.
Figure 4:
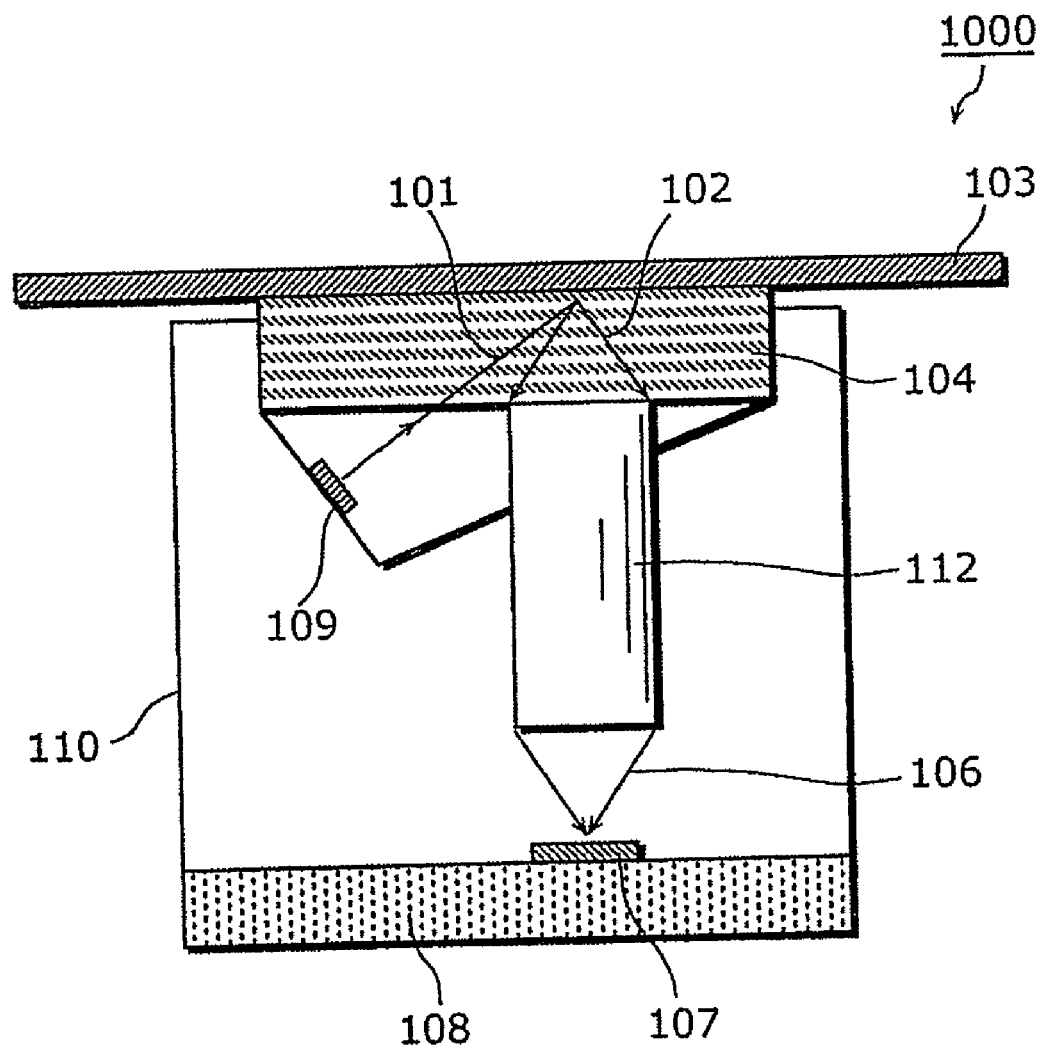
FIG. 4. is a diagram showing a basic structure of a conventional pixel.
Figure 5:
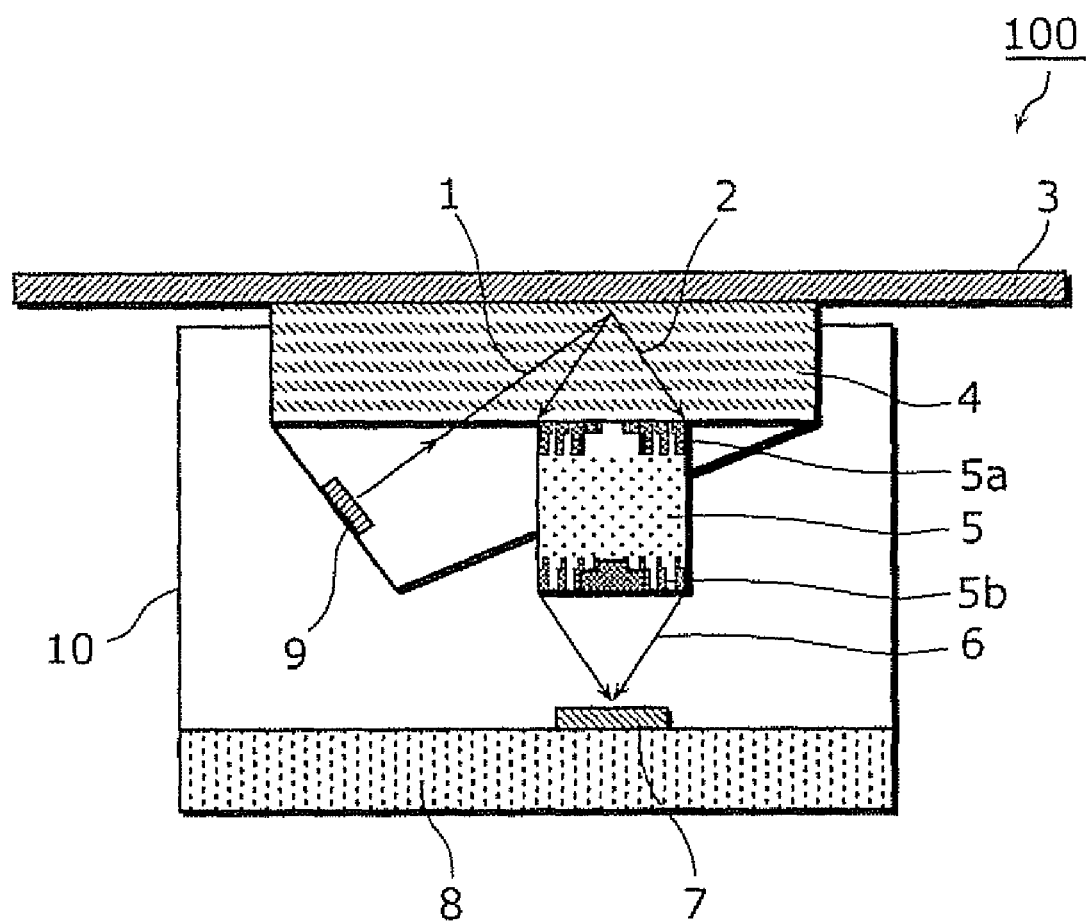
FIG. 5. is a diagram showing a basic structure of a pixel according to a first embodiment.

FIG. 5 is a diagram showing a contact-type solid-state imaging apparatus 100 which supports a resolution 600 dpi of the present embodiment. The contact-type solid-state imaging apparatus 100 in FIG. 5 is an example of a structure by pixel unit, and includes a protection glass plate 4, a light-collecting device 5, a light-receiving device 7, a semiconductor integrated circuit 8, a light emitting diode (LED) 9 and a mounting package 10.

A light emitted from the LED 9 is diffused and reflected on the surface of the object (original copy) 3, and is collected at the light-receiving device 7 via the light-collecting device 5. At this timer the light-collecting device 5 has two distributed index lenses 5a and 5b.

Figure 6A:
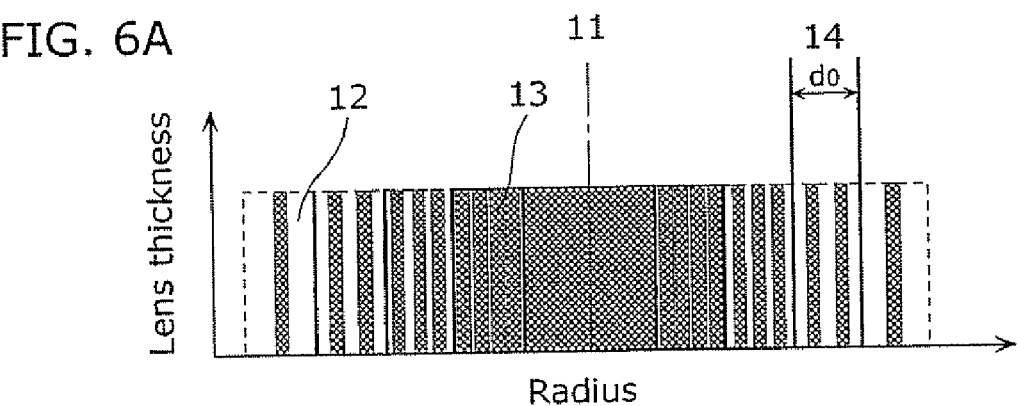
FIG. 6A and FIG. 6B are cross-sectional diagrams, as examples, showing a distributed index lens according to the first embodiment.

FIG. 6A is a cross-sectional diagram showing the distributed index lens with a concentric structure including $SiO_2$ 12 (refractive index=1.45) and SiN 13 (refractive index=2.0) of the present embodiment. The refractive index of such general distributed index lens shows its highest index at the pixel center (this case, the pixel center is the optics center) 11. In the case of the present embodiment, SiN 13 is densely collected at the unit area (hereafter called as zone area) around the pixel center 11 (in other words, the ratio of SiN 13 is increased), and SiN 13 becomes sparse towards the outer zone area (in other words, the ratio of SiN 13 is decreased). At this time, in a case where the width d of each zone area (hereafter called as "line width") 14 is almost same as or less than a width of a wavelength of an incident light, an effective refractive index which a light senses is defined according to a volume ratio between a high refractive index material (for example, SiN 13) and a low refractive index material (for example, $SiO_2$ 12). More specifically, when the high refractive index material is increased in each zone area, the effective refractive index is raised, while when the high refractive index material is decreased relative to the low refractive index material in the zone area, the effective refractive index is lowered.

The most distinguished characteristic of the present embodiment is that the combination of the volume ratio of the high refractive index material in the zone area, so that the refractive index distribution can be controlled without constrain.

The refractive index distribution of the distributed index lens is denoted by the following equation (1):

$$\Delta n(x) = \Delta n_{max} \left[ \frac{(Ax^2 + Bx\sin\theta)}{2\pi} + C \right] \quad (A, B, C: \text{constants}) \quad (1)$$

Here, $\Delta n_{max}$ indicates a difference of refractive indexes (this case is 0.55) between an incoming side medium and a lens material. Furthermore, in the equation (1), the parameters can be set by the equations below, where the refractive index on the incoming side medium is $n_o$, and the refractive index on the outgoing side medium is $n_1$:

$$A = -(k_0 n_1)/2f \quad (2)$$

$$B = -k_0 n_0 \quad (3)$$

$$k_0 = 2\pi/\lambda \quad (4)$$

Thus, a lens can be optimized according to the respective factors: a desired focal length, an incident angle of the incident light θ to be objected, and a wavelength λ. It should be noted that the term defined by quadric of a distance x from the pixel center denotes a collecting-light component, and the term defined by product of x and trigonometric function denotes a deflection component respectively in the equation (1).

The parabolic defined by the equation (1) is continuous obviously, and shows an ideal refractive index distribution. However, according to the actual micro optic system (submicron area), forming a continuous distribution is extremely difficult, and the process loads is so heavy. According to the present invention, a discretization by the area not more than half-width of an incident light wavelength is performed, and the volume filling factor is controlled for the refractive index distribution of a lens. Thus, the same effect can be achieved successfully.

Figure 6B:
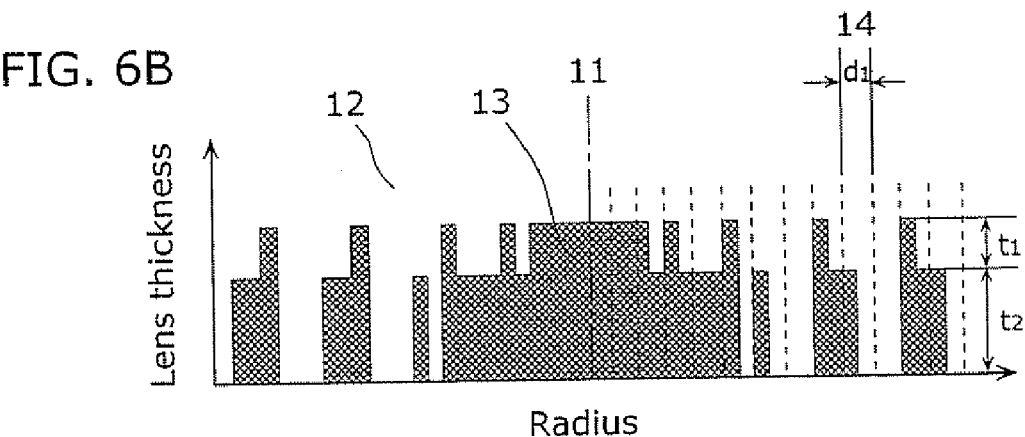

FIG. 6B is a cross-sectional diagram showing the distributed index lens having an upper and lower two-stage concentric structure (hereafter called as "two-stage concentric structure"). The major material of the two-stage concentric structure shown in FIG. 6B is SiN 13, and the medium surrounding the structure is $SiO_2$ 12. The upper film thickness to at light incident side is 0.4 μm and the lower film thickness $T_2$ at substrate side is 0.8 μm, and the film thickness ratio (upper/lower) is 0.5. A light-collecting generated by the refractive index distribution can be strengthened by a film thickness distribution. In general, in the diffraction optics, a structure greater than a wavelength is systematized by Fourier optics, and a structure smaller than a wavelength is systematized by the effective refractive index method. A light is regarded as a line in the former case, while a light is regarded a phenomenon in an electromagnetic field in the latter case, A resonance area is an area placed between the aforesaid two theoretical regions, and the behavior of a light is allowed in either a line or an electromagnetic field.

Here, in the lens structure of the present invention, the width $d_1$ into which the zone area is further finely divided concentrically is set as around "λ/2n", which is on the boundary between the resonance area and the effective refractive index method. In this state, the incident light senses both a refractive index of the material itself, and a refractive index (effective refractive index) which is equalized according to the structure. As a result, the lens has the light-collecting characteristics of both the distributed index lens and the film thickness distribution lens, so that the light-collecting effectiveness becomes higher than a conventional distributed index lens.

Here, for the distributed index lens shown in FIG. 6A and FIG. 6B, the shape of the incident window area is rectangular in accordance with the aperture of each pixel. In general, in the case where the shape of the incident window area is circle, gaps between lenses are generated. Therefore, light is leaked from the gaps, so that a light-collecting loss is increased However, when the shape of the incident window is rectangular, it is possible to collect incident light with the whole area of the pixel. Therefore, light does not leak, so that the light-collecting loss can be reduced.

Figure 7A:
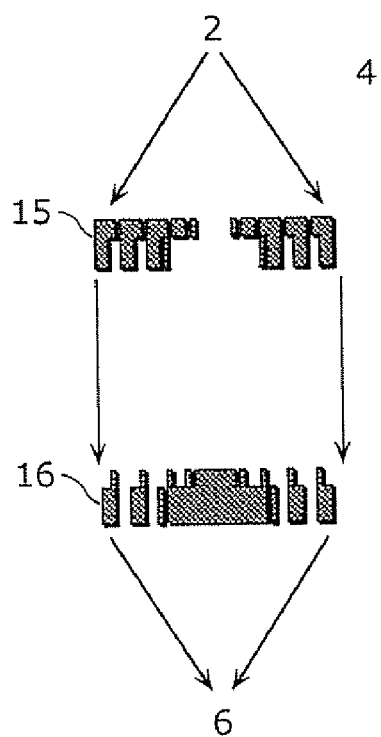
FIG. 7A is a cross-sectional diagram, as an example, showing a light-collecting device of the first embodiment.
Figure 7B:
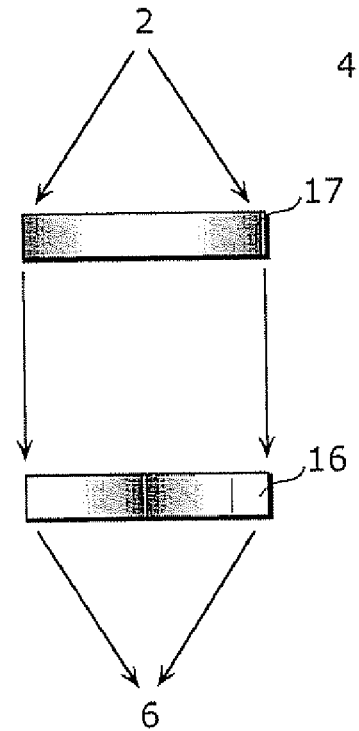
FIG. 7B is a diagram, as an example, showing a refractive index distribution of a light-collecting device of FIG. 7A.

FIG. 7A is a diagram showing a structure of a light-collecting device of the present embodiment. FIG. 7A shows two kinds of optical systems structured by the distributed index lens having the two-stage concentric structure. A reflected light (incident light) 2 from the object 3 is parallelized by a collimate lens 15, transmitted through the protection glass plate 4, and then collected to the light-receiving device 7 onto the light-collecting lens 16. At this time, the refractive index distribution is shown by gray scale in FIG. 7B, the refractive index distribution 17 of the collimate lens 15 on the first level is O-lens type in which the refractive index of the center area is low, while the refractive index distribution 18 of the light-collecting lens 16 on the second level is a convex lens in which the refractive index of the center area is high.

FIG. 8A to FIG. 8G are diagrams showing a manufacturing process of the distributed index lens of the present invention. The distributed index lens has a two-stage concentric structure, and photo-lithography and etching are performed two times respectively in the process. One pixel is 42 μm square in size.

Figure 8A:
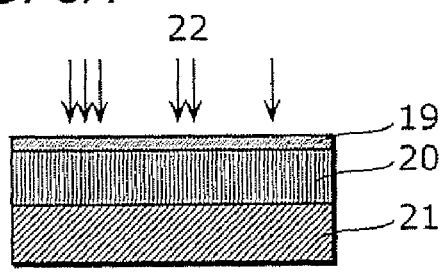
FIG. 8A to FIG. 8G are diagrams showing a manufacturing process of the distributed index lens according to the first embodiment.
Figure 8E:
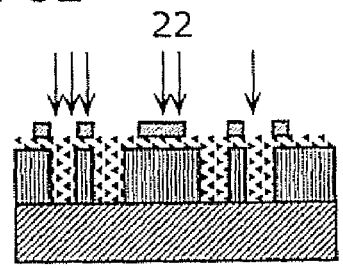
Figure 8B:
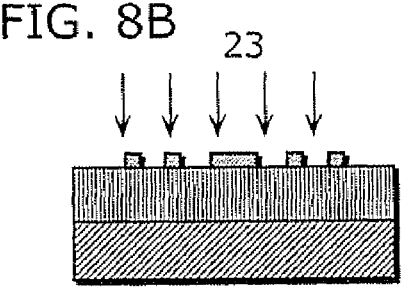
Figure 8F:
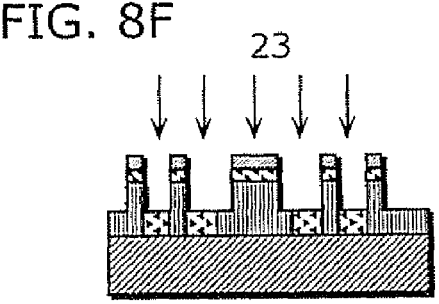
Figure 8C:
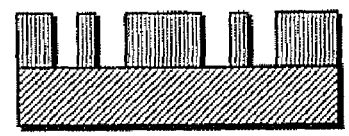
Figure 8G:
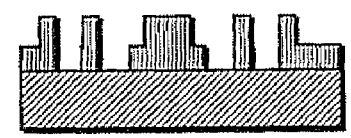
Figure 8D:
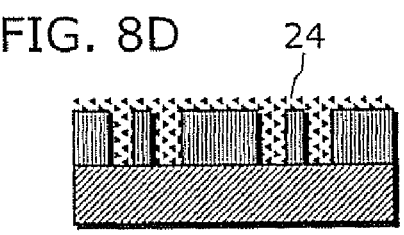

Firstly, on an $SiO_2$ substrate 21, an SiN film 20 is formed, and a resist 19 is coated thereon using a CVD device (FIG. 8A). Then, a patterning is performed by a light exposure 22 (refer to FIG. 8B). The thickness of the SiN film 20 is 1.2 μm and the resist 19 is 0.5 μm respectively. After developing, a fine structure is formed on the pixel surface by etching 23 (FIG. 8C). After removing the resist 19, BARK (Bottom Anti-reflection Coating) is embedded so as to planarize the surface (FIG. 8D). After applying the resist 19, a patterning is performed by the light exposure 22 again (FIG. 8E). After the etching (FIG. 8F), the resist 19 and the BARK are removed so as to form the lens of the present invention (FIG. 8G). The aforesaid embedding onto $SiO_2$, photo-lithography and etching are iterated in the manufacture process, so as to form a light-collecting device having plural distributed index lens.

In the present embodiment, forming a distributed index lens having two-stage concentric structure is shown. In addition, a lens having plural stages (more than three stages) can be formed by a process combining photo-lithography and etching shown in FIG. 8A to FIG. 8G. The more the number of stages is increased, the more the limit of the resolution is increased, so that the light-collecting efficiency is improved.

Figure 9:
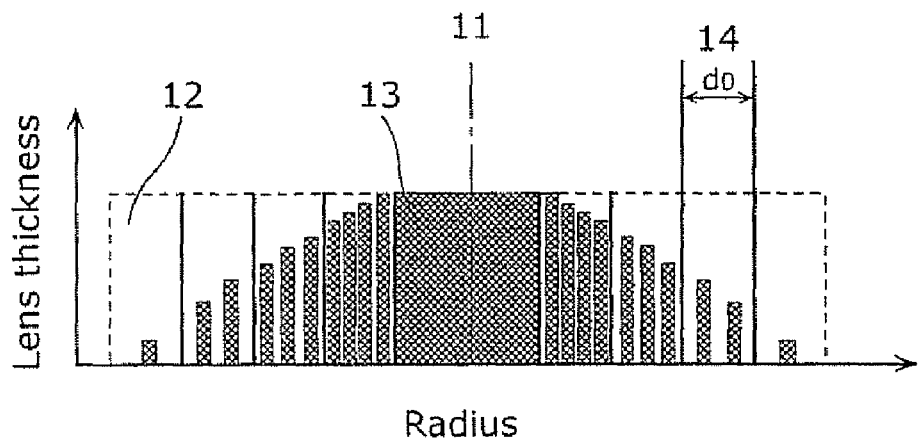
FIG. 9. is a cross-sectional diagram, as an example, showing the distributed index lens according to the first embodiment.

In the process shown in FIG. 8A to FIG. 8G, the surface of the distributed index lens is planarized. However, it is possible to make the part of or whole of the distributed index lens have a curvature by an etch-back method and the like. Accordingly, it is possible to perform a sampling for the film thickness distribution finely, so that the light-collecting efficiency can be improved dramatically (refer to FIG. 9).

It should be noted that the lens to be mentioned in the embodiments hereafter are formed by the aforesaid process.

Second Embodiment

Figure 10:
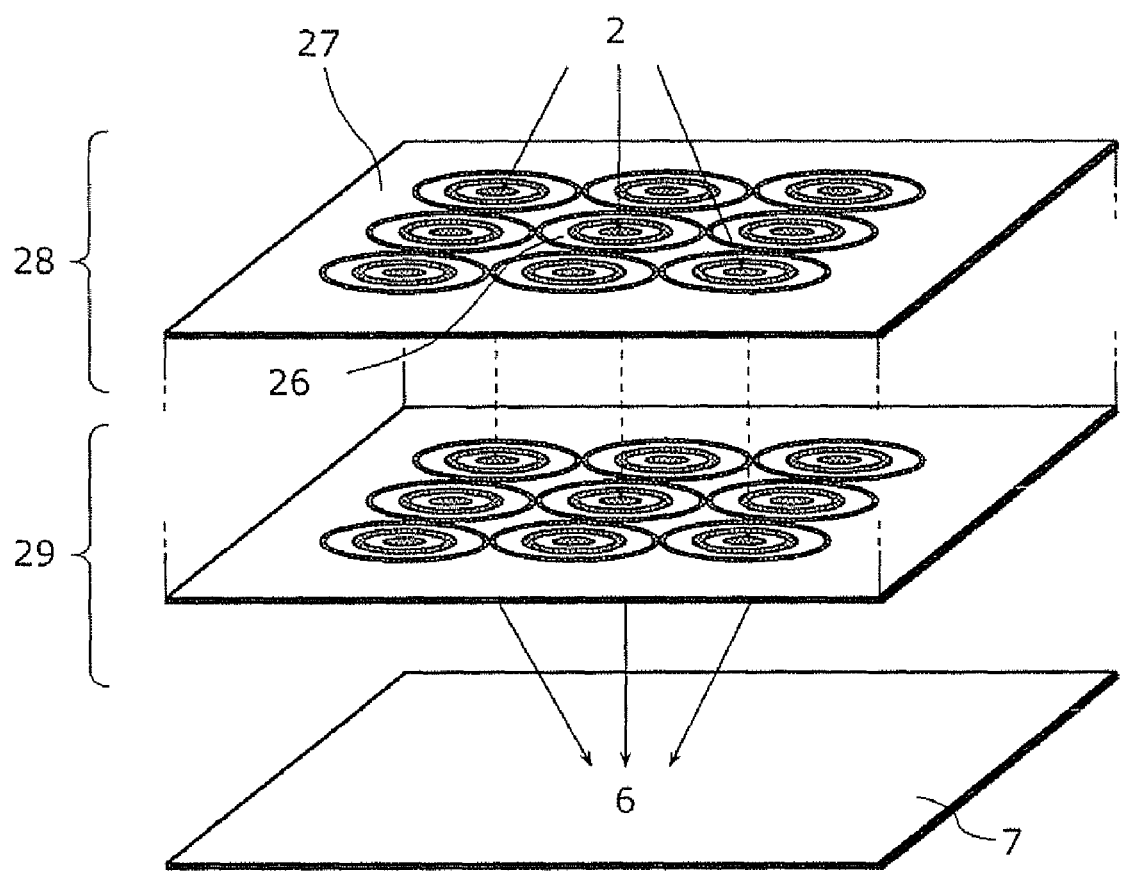
FIG. 10 is a diagram showing a basic structure of a light-collecting device and a pixel array according to the second embodiment.
Figure 11A:
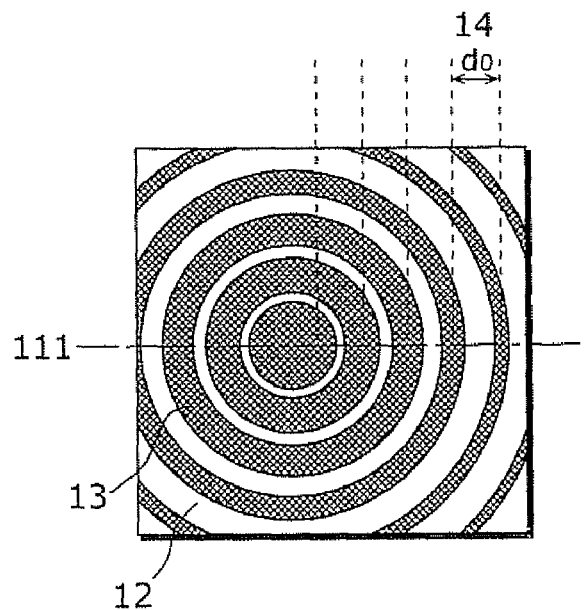
FIG. 11A is a diagram showing a top view of the distributed index lens according to a second embodiment.
Figure 11B:
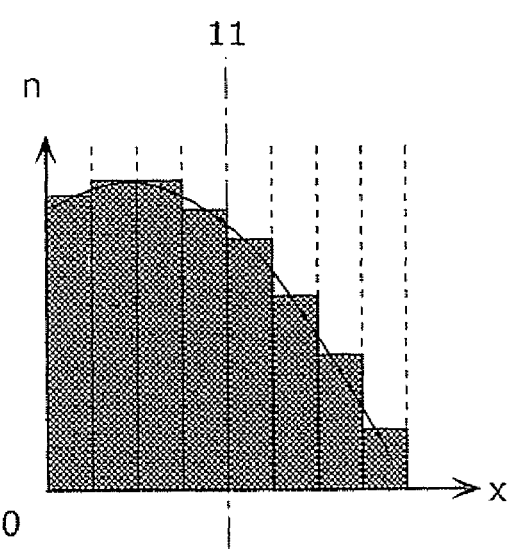
FIG. 11B is a diagram showing a refractive index distribution of the distributed index lens according to the second embodiment.

FIG. 10 is a diagram showing the light-collecting apparatus in the contact-type solid-state imaging apparatus of a color scanner for a personal computer (300 dpi) and a pixel array of the second embodiment. A signal light 2 is collected by a light-collecting apparatus 27 structured by plural distributed index lens 26 arranged in two-dimensional array, and is irradiated onto a single light-receiving device 7. Here, the light-collecting apparatus 27 includes a lens group at incident light side 28 and a lens group at light outgoing side 29, and the each lens group has a light-collecting and a deflecting. In this state, as for an incident light which is incident vertical with respect to the in-plane direction of the light-collecting apparatus 27, the parameter θ of the aforesaid equation (1) is 0°. The concentric structure of the distributed index lens 26 is symmetrical with respect to the pixel center. However, when the incident angle is increased (θ component is increased), the center of the concentric structure is shifted from the pixel center, and the distributed index lens 26 is asymmetrical (refer to a top view of the distributed index lens in FIG. 11A with respect to the light axis. This is because that in the aforesaid equation (1) the absolute value of the deflection component defined by the product of x and trigonometric function is increased. FIG. 11B is a diagram showing a discretization refractive index distribution on a straight line 111 which is formed by connecting a pixel center and the top of the refraction index distribution. It can be seen in FIG. 11B that the top of the refraction index distribution is shifted from the pixel center 11,.

Figure 12:
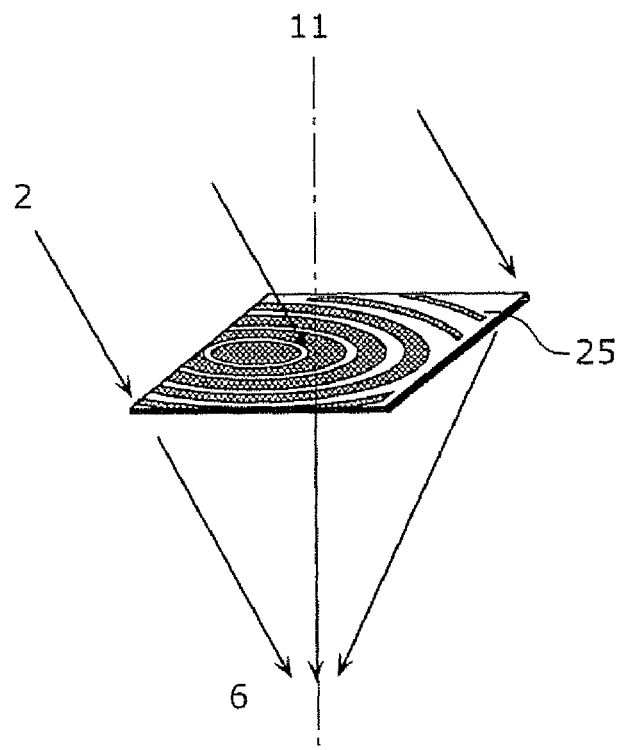
FIG. 12 is a diagram showing a transmission of a light in the distributed index lens according to the second embodiment.

FIG. 12 is a diagram showing a light transmitted through the asymmetric distributed index lens. The light 2 which is incident from a particular angle is deflected by a lens 25 having asymmetric refraction index distribution with respect to the pixel center 11, and is collected onto the pixel center 11 axis.

As for a general distributed index lens, a phase modulation with turnover portions based on a single phase is formed (for example, Fresnel lens), so as to make the film thickness thin. At this time, it is possible to collect lights with high efficiency at the first zone area (reflection area) of the pixel center. However, in the high degree of zone area more than the second zone, some light-collecting losses are generated due to a light-collection by diffraction phenomena. More particularly, in the case where the lens focal length becomes short in order to make the film of the light-collecting apparatus thin, the phenomenon is evident. In view of this, in the present embodiment, plural distributed index lens having only low degree of zone area are arranged in plural arrays so as to implement the light-collecting to a single light-receiving device. Accordingly, it is possible to reduce the high degree of diffraction area in the light-collecting apparatus, so that the light-collecting loss can be reduced and the sensitivity of the sensor can be improved.

Note that, although the light-collecting apparatus in which the light-collecting device is arranged in a two-dimensional array is exemplified in the present embodiment, the light collecting device may be arranged in a one-dimensional array in the light-collecting apparatus.

Third Embodiment

Figure 13:
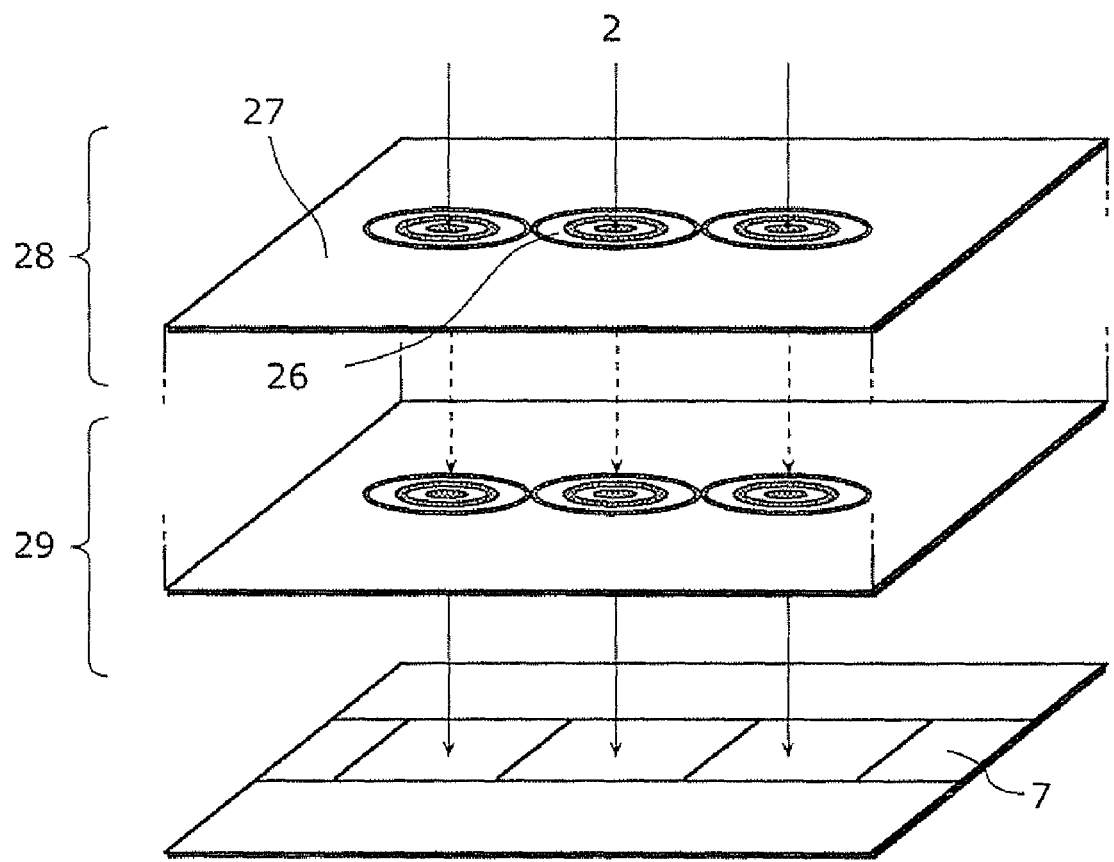
FIG. 13 is a diagram showing a basic structure of a light-collecting device and a pixel array according to the third embodiment.

FIG. 13 is a diagram showing the light-collecting apparatus in the contact-type solid-state imaging apparatus of a color scanner for a personal computer (300 dpi) and a pixel array of the third embodiment. The signal light 2 is collected by the light-collecting apparatus 27 structured by plural distributed index lens 26, and is irradiated onto the single light-receiving device 7. Here, the light-collecting apparatus 27 includes a lens group at incident light side 28 and a lens group at light outgoing side 29. In this case, the incident light 2 is near-vertical with respect to the in-plane direction of the light-collecting apparatus, and thus the parameter θ of the aforesaid equation (1) is 0°. The concentric structure of the distributed index lens 26 is symmetrical with respect to the pixel center.

In the present embodiment, a line sensor of 300 dpi is used as an example. When the lens diameter of the distributed index lens is smaller, it is possible to correspond to finer pixels. For example, when the light-receiving device with about 3M pixel used for digital camera and the like is used, the pixel pitch is about 3 μm and the resolution is 6000 dpi.

Fourth Embodiment

In the case of the normal thickness distribution lens, it is necessary to form achromatic lens in order to compensate chroma aberration. The conventional lens is formed by a combination of a convex lens (crown glass) in which a refractive index difference by wavelength is small, and a concave lens (flint glass) in which a refractive index difference by wavelength. However, there exists a problem that fining the achromatic lens stuck two materials together is difficult and is expensive.

Figure 14A:
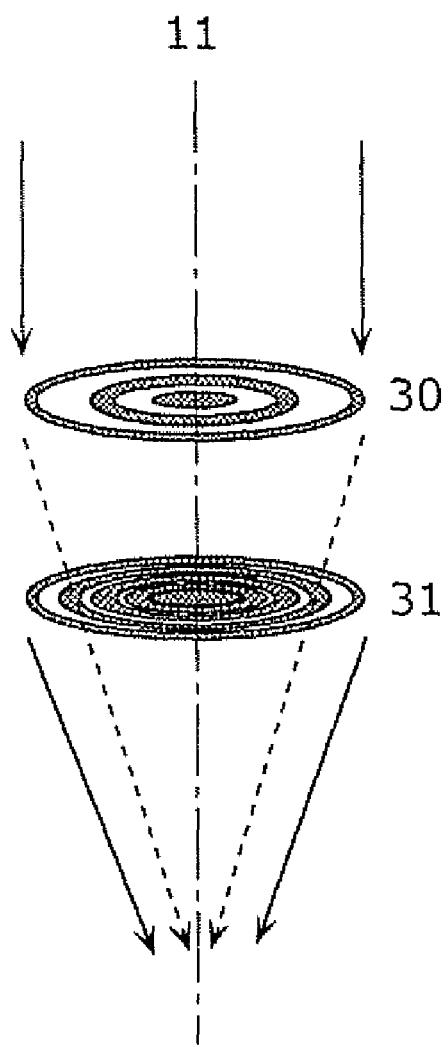
FIG. 14A and FIG. 14B are diagrams showing a basic structure of a pixel array according to a fourth embodiment and a fifth embodiment.

FIG. 14A is a diagram showing a combination of two distributed index lenses for compensating a chroma aberration. Note that FIG. 14A shows a part of the lens group at light outgoing side of the light-collecting apparatus. In view of the aforesaid problem, it is possible to control the focal length using the wavelength of the incident light as a parameter in the distributed index lens of the fourth embodiment, so that the aforesaid problem can be handled by the distributed index lens. As shown in FIG. 14A, in the case where a short-wavelength lens 30 and a long-wavelength lens 31 are combined, a constant light-collecting can be expected irrespective of the wavelength of the light source. Especially, in the case where a white light is used as a source, a lens group with a parameter setting of three-primary colors (450 nm, 550 nm, 650 nm) is combined, so that a high light-collecting efficiency to the light-receiving device can be expected without defocus.

Fifth Embodiment

Figure 14B:
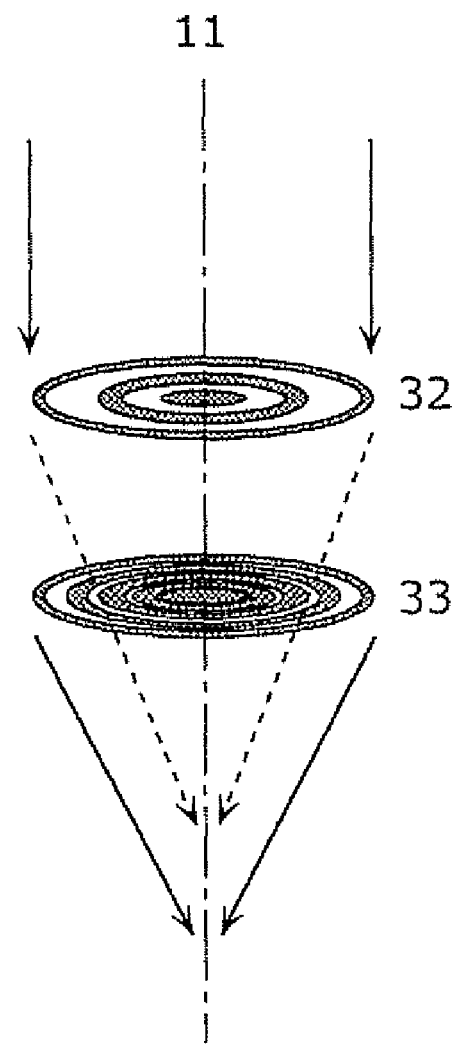

FIG. 14B is a diagram showing a combination of two distributed index lenses for compensating a defocus of the fifth embodiment. Note that FIG. 14B shows a part of the lens group at light outgoing side of the light-collecting apparatus. As shown in FIG. 14B, in the case where a short-wavelength lens 33 and a long-wavelength lens 32 are combined, a signal light can be inducted to the light-receiving device efficiently irrespective of some change of the distance between the original copy and the light-collecting device.

Sixth Embodiment

Figure 15A:
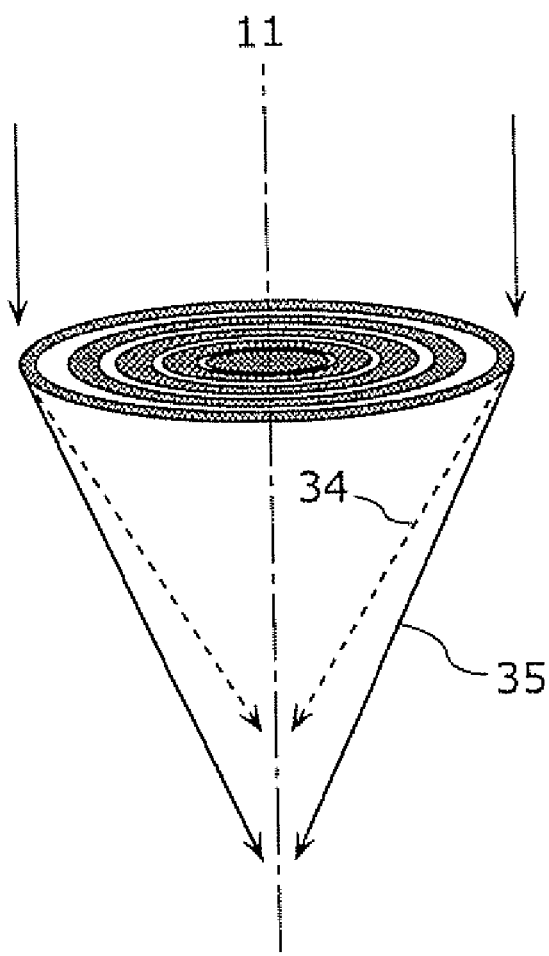
FIG. 15A and FIG. 15B are cross-sectional diagrams, as examples, showing the distributed index lens according to a sixth embodiment.
Figure 15B:
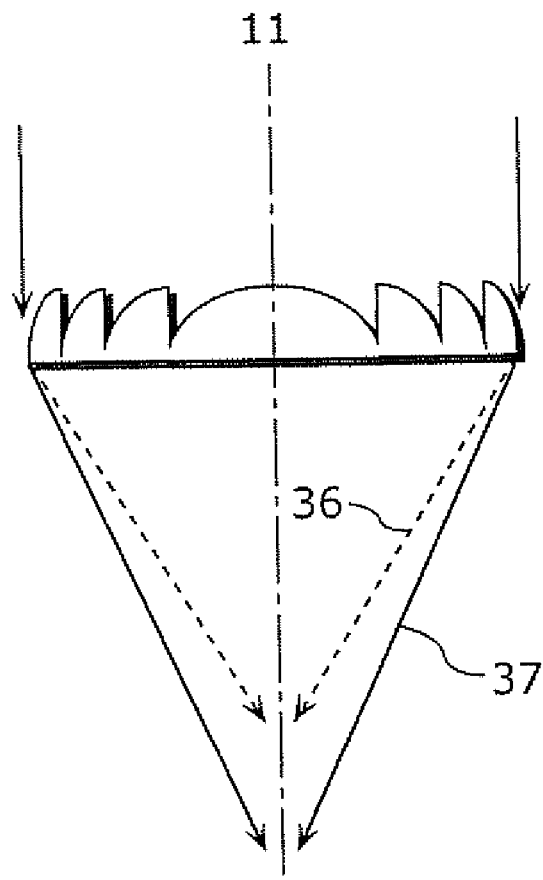

FIG. 15A and FIG. 15B are diagrams showing an example of the distributed index lens for compensating a defocus of the sixth embodiment. Note that FIG. 15A and FIG. 15B show a part of the lens group at light outgoing side of the light-collecting apparatus. In a light-collecting system having refractive index distribution and thickness distribution of Fresnel lens, the incident light is collected by refractive phenomenon (0-degree diffraction lights 34 and 36) and diffraction phenomenon (1-degree diffraction lights 35 and 37). Here, the 0-degree diffraction light is collected to the first focus, and also the 1-degree diffraction light is collected to the second focus, so that the signal light can be inducted to the light-receiving device efficiently irrespective of some change of the distance between the original copy and the light-collecting device.

Seventh Embodiment

Figure 16:
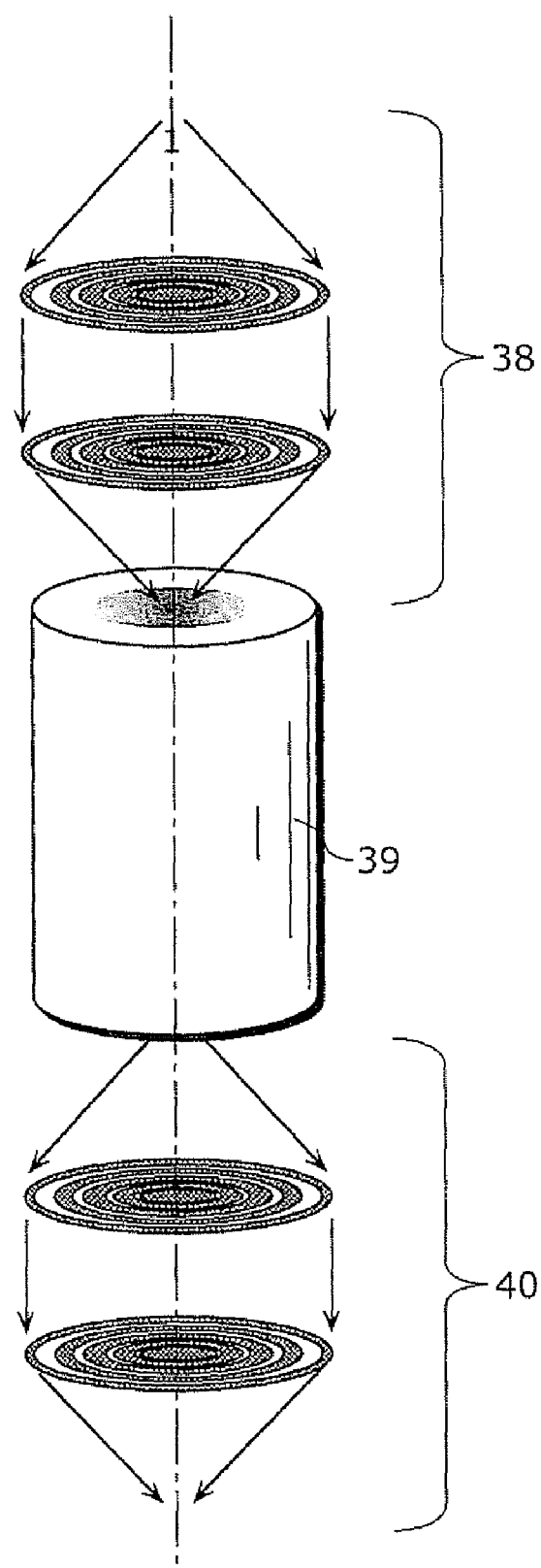
FIG. 16 a cross-sectional diagram, as an example, showing a light-collecting device according to a seventh embodiment.

FIG. 16 is a diagram showing the light-collecting apparatus having an optical waveguide structure of the seventh embodiment. The incident light is inducted to the core part of a waveguide 39 by an incoming side imaging system 38, and then transmitted to near the light-receiving device through the waveguide 39 where the light-collecting loss is low. After this, the emitted light is collected to the light-receiving device by an incoming side imaging system 40. In the present embodiment, a single-mode fiber with core diameter 10 μm is used for the transmission. However, any kind of optical waveguide structure having light-containing effect which is generated by a difference of reflection index can be used.

As described above, the optical waveguide is formed in the light-collecting apparatus, so that the incident light can be induced to the light-receiving device efficiently, and the sensitivity of the sensor can be improved.

Eighth Embodiment

Figure 17:
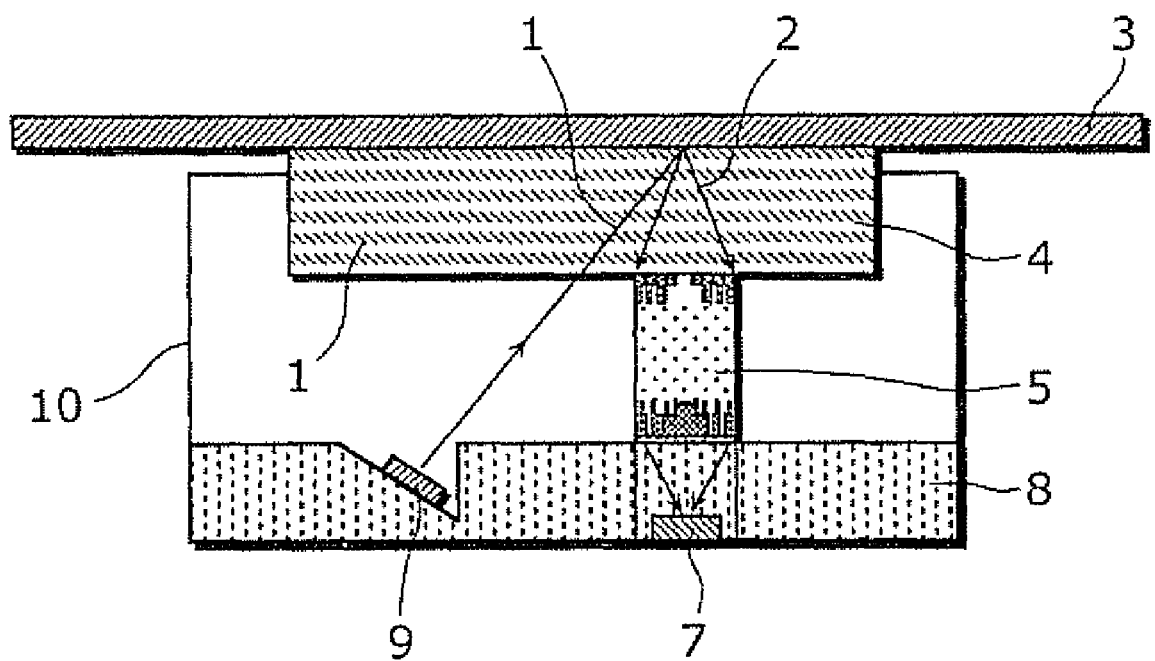
FIG. 17 is a diagram showing a cross-sectional diagram of a contact-type solid-state imaging apparatus according to an eighth embodiment.

FIG. 17 is a diagram showing a fundamental structure of the contact-type solid-state imaging apparatus supporting resolution 600 dpi of the eighth embodiment. Each pixel includes the protection glass plate 4, the light-collecting device 5, the light-receiving device 7, the semiconductor integrated circuit 8, the light emitting diode (LED) 9 and the mounting package 10. Here, the light-collecting device 5 is formed in monolithic on the semiconductor integrated circuit. Accordingly, the light-collecting device 5 can be formed by a serial Si process, so that the accuracy of positioning of optical system can be improved. In addition, the lens setting is not required, so that the mounting can be easy, and the fact results in reduction in cost.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The contact-type solid-state imaging apparatus of the present invention realizes performance improvement and price reductions for line sensor related products such as scanner, facsimile, and is useful for the related industries.

What is claimed is:

1. A contact-type solid-state imaging apparatus comprising a plurality of unit pixels arranged in a two-dimensional array or a one-dimensional array, each of said unit pixels including a light-collecting device and a light-receiving device,
    wherein said light-collecting device includes at least two different optical systems, each of which has an effective refraction index distribution in an incident window area,
    the effective refraction index distribution includes a combination of a plurality of zone areas with a concentric structure, the plurality of zone areas being divided into line widths which are equal to or shorter than a wavelength of incident light,
    the optical systems are located at a paraxial imaging position in-line with a transmission direction of an incident light, and
    the incident window area of each of the optical systems has a rectangular shape in accordance with an aperture of each unit pixel.

2. The contact-type solid-state imaging apparatus according to claim 1,
    wherein at least one of the plurality of zone areas includes:

a lower light-transmitting film with the concentric structure and having a first line width and a first film thickness; and an upper light-transmitting film with the concentric structure, configured above said lower light-transmitting film, and having a second line width and a second film thickness.

3. The contact-type solid-state imaging apparatus according to claim 1, wherein the effective refraction index distribution of said light-collecting device is asymmetric with respect to an optical axis.

4. The contact-type solid-state imaging apparatus according to claim 1, wherein the light-collecting device comprises a plurality of light-collecting devices, wherein a light incident to said plurality of light-collecting devices is transmitted to said light-receiving device.

5. The contact-type solid-state imaging apparatus according to claim 1, wherein at least one of the two different optical systems located at the paraxial imaging position has a different chromatic aberration from an other of the at least two different optical systems.

6. The contact-type solid-state imaging apparatus according to claim 1, wherein at least one of the two different optical systems at the paraxial imaging position has a different focal length from an other of the two different optical systems.

7. The contact-type solid-state imaging apparatus according to claim 1, wherein said light-collecting device includes a first light-collecting unit for collecting light by a diffraction, and a second light-collecting unit for collecting light by refraction.

8. The contact-type solid-state imaging apparatus according to claim 1, wherein said light-collecting device is formed in monolithic on a semiconductor integrated circuit on which a light-receiving device is formed.

9. The contact-type solid-state imaging apparatus according to claim 1, wherein the optical systems form an optical waveguide structure having a light containing effect generated by a high-low difference in reflection indexes.

10. The contact-type solid-state imaging apparatus according to claim 1, wherein a part or whole of the optical system comprises a convex structure having a curved cross-section.

* * * * *